United States Patent

Bunce et al.

[11] Patent Number: 5,970,460
[45] Date of Patent: Oct. 19, 1999

[54] SPEECH RECOGNITION AND EDITING SYSTEM

[75] Inventors: Erik Bunce, Stow, Mass.; Douglas Gerard, Rochester, N.Y.; Harley Rosnow, Kirkland, Wash.

[73] Assignee: Lernout & Hauspie Speech Products N.V., Ieper, Belgium

[21] Appl. No.: 08/986,006

[22] Filed: Dec. 5, 1997

[51] Int. Cl.⁶ .................................................. G10L 5/00
[52] U.S. Cl. ........................ 704/278; 704/270; 704/275
[58] Field of Search .................................. 704/270, 275, 704/178

[56] References Cited

U.S. PATENT DOCUMENTS

4,914,704  4/1990  Cole et al. ............................... 704/270
5,127,055  6/1992  Larkey ..................................... 704/270

*Primary Examiner*—David R. Hudspeth
*Assistant Examiner*—Daniel Abebe
*Attorney, Agent, or Firm*—Bromberg & Sunstein LLP

[57] ABSTRACT

The system disclosed herein employs a method for facilitating access to supplemental information relating to text items entered into an editing application program by a speech recognition system, e.g. alternate translations of utterances stored in a dictation event database (DEDB). A speech event database (SEDB) associated with the editing program is maintained so as to contain text items entered by said speech recognition system and context information identifying preceding and following text items. In response to a user initiated change in the editing point, a context list is created characterizing a region of text around the new editing point. The speech SEDB event database is searched for text items matching items in said context list thereby to create a mapping of the list to the SEDB. The speech event database is then used as an index into said dictation event database, e.g. for correcting previously misrecognized utterances.

10 Claims, 6 Drawing Sheets

SPEECH RECOGNITION AND EDITING SYSTEM

BACKGROUND OF THE INVENTION

The present invention relates to speech recognition systems and more particularly to a speech recognition system working in conjunction with a text editing program and providing text input thereto.

Most modern speech recognition systems respond to a dictation event by generating not only a best match word corresponding to the dictation event but also a ranked list of alternate translations, together with a facility which allows the user to select one of the alternate translations from the list if the initially identified best match is not the correct translation. Preferred speech recognition systems also maintain a historical database of dictation events which records not only the list of alternate translations for each dictation event but also other useful information such as the acoustical record which is useful in training up word models. One system for maintaining such a historical database is disclosed in U.S. Pat. No. 5,231,670 issued Jul. 27, 1993 to Richard S. Goldhor et al. A system for improving word models based upon a user's acceptance of a translation or his choosing of an alternate is disclosed in U.S. Pat. No. 5,127,055 issued Jun. 30, 1992 to Leah S. Larkey.

Typically, speech recognition systems are used in conjunction with a separate editing or word processing application program with the speech recognition system being operative to provide successive text items to the editing program as the user makes successive utterances. A common difficulty with prior speech recognition/editing systems is that the speech recognition system loses context when the user changes the editing point in the editing program, e.g. by moving the editing cursor with the mouse or keyboard in computer systems providing a graphical user interface (GUI). Loss of context means that the speech recognition system no longer has information as to where the edit point is relative to the historical database maintained by the speech recognition system.

Among the several objects of the present invention may be noted the provision of a method for maintaining context between an editing program and a speech recognition system; the provision of such a method which facilitates access to supplemental information relating to text items obtained through the speech recognition system; the provision of a system allowing the user of an editing program to readily access alternate translations of text items entered into a document by a speech recognition system; the provision of such a system which facilitates the improvement of word models based on the user's correction of misrecognized speech events; the provision of such a system which is highly reliable and which is of relatively simple and inexpensive implementation. Other objects and features will be in part apparent and in part pointed out hereinafter.

SUMMARY OF THE INVENTION

The present invention facilitates access to supplemental information relating to text items entered into an editing application program by a speech recognition system. The supplemental information typically includes alternate translation of dictation events stored in a database maintained by the speech recognition system. A speech event database is maintained in association with the editing program and contains text items entered by the speech recognition system together with context information identifying preceding and following text items. When the user initiates a change in the edit point in the editing program, a preselected region of text around the new edit point is extracted and cached to generate a context list. The speech event database is then searched for text which matches items in the context list thereby to create a mapping of the list to the speech event database. As to items in the context list for which no match is found, new items in the speech event database are synthesized. The speech event database can then be used as an index into the dictation event database for commands correcting previously misrecognized dictating events.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
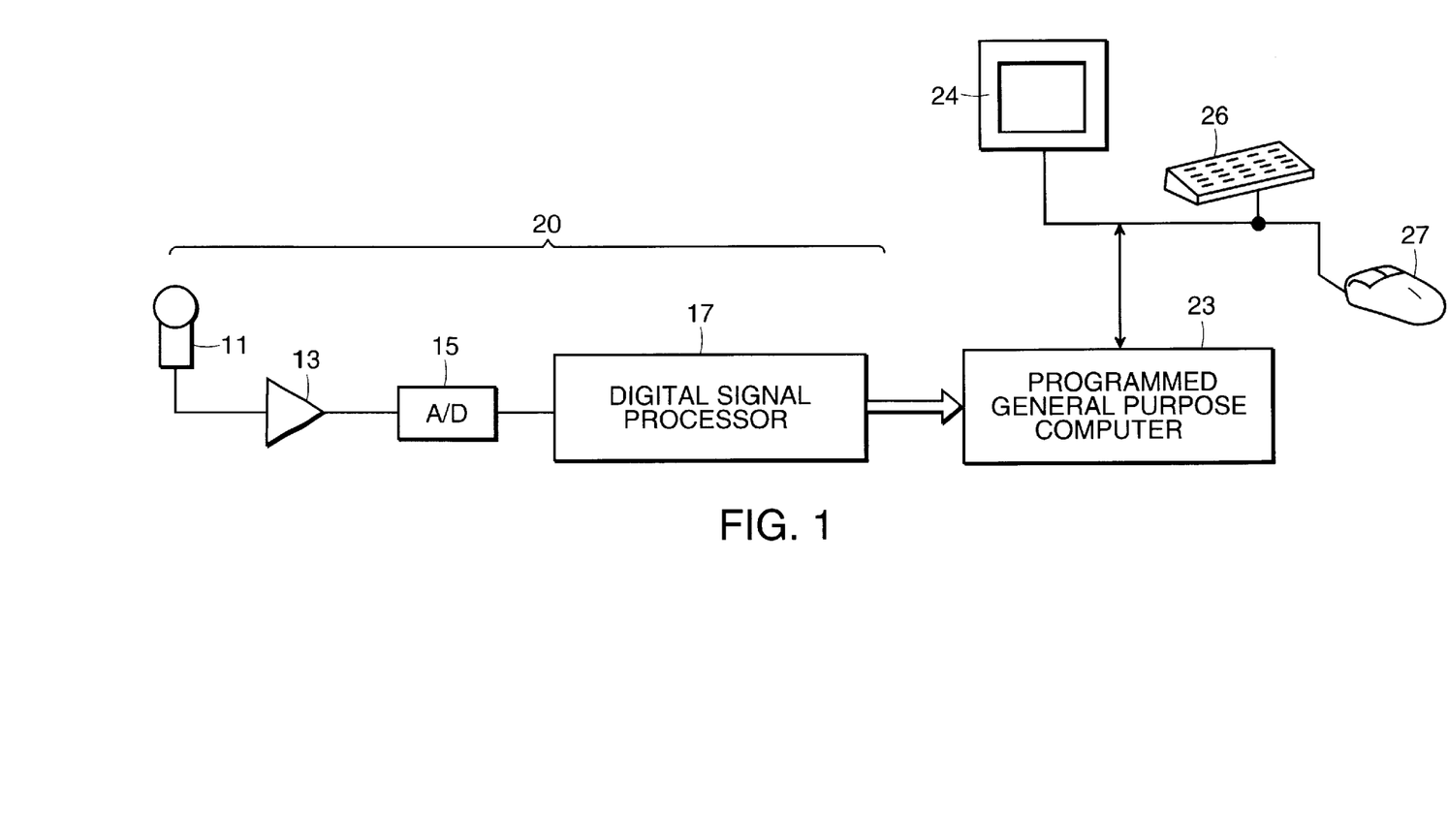
FIG. 1 is a block diagram representing the hardware components of a speech recognition system of the present invention.

In common with many prior art systems, the preferred embodiment of the system of the present invention operates by first transducing acoustic speech waveforms to obtain corresponding electrical signals and then digitizing those signals. With reference to FIG. 1, the transducer indicated there is a microphone 11 which is connected, through a suitable preamplifier 13, to an analog-to-digital converter 15. The gain of pre-amplifier 13 is preferably adjustable under software control. As is usual in the art, the digitized speech signal is treated to obtain, at a succession of sample times, a sequence of digital values or data frames which characterize the speech. In the embodiment illustrated, these values are obtained by passing the speech signal through a digital signal processor 17 which performs a Fourier transform so as to extract spectral features characterizing the input speech. The collection of digital values defining the input spectrum at a given moment of time is referred to hereinafter as a frame. Each frame may be considered to be a multidimensional vector as understood by those skilled in the art.

Collectively, the front end circuitry is identified by reference character 20. Though the input signal processing is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding which might also be done by special purpose hardware.

A general purpose microcomputer system 23, e.g., one employing an Intel Pentium microprocessor, is provided for general system management and control functions, as well as for the processing of distance or scoring calculations. As is conventional, computer 23 incorporates a video display 24, a keyboard 26 and a mouse 27 for providing interaction with the system user.

The raw spectral information obtained from the front end circuitry 20 is further preprocessed in the computer 23 to replace each sample or input frame with an index which corresponds to or identifies one of a predetermined set of standard or prototype spectral distributions or frames. In the particular embodiment being described, 1024 such standard frames are utilized. In the art, this substitution is conventionally referred to as vector quantization and the indices are commonly referred to as VQ indices.

The preprocessing of the input data by the computer 23 also includes an estimating of the beginning and end of a word or continuous phrase in an unknown speech input segment, e.g. based on the energy level values. For this purpose, the input circuitry may incorporate a software adjustable control parameter, designated the "sensitivity" value, which sets a threshold distinguishing user speech from background noise.

Vocabulary models are represented by sequences of standard or prototype states, which are represented by indices. Rather than representing spectral distributions, the state indices identify or correspond to probability distribution functions. The state spectral index essentially serves as a pointer into a table which identifies, for each state index, the set of probabilities that each prototype frame or VQ index will be observed to correspond to that state index. The table is, in effect, a precalculated mapping between all possible frame indices and all state indices. Thus, for comparing a single frame and single state, a distance measurement or a measure of match can be obtained by directly indexing into the tables using the respective indices and combining the values obtained with appropriate weighting. It is thus possible to build a table or array storing a distance metric representing the closeness of match of each standard or prototype input frame with each standard or prototype model state.

As is understood by those skilled in the art, the distance or likelihood values which fill the tables can be generated by statistical training methods. Various such training methods are known in the art and, as they do not form a part of the present invention, they are not described in further detail herein. Rather, for the purposes of the present invention, it is merely assumed that there is some metric for determining degree of match or likelihood of correspondence between input frames and the states which are used to represent vocabulary models. A preferred system for precalculating and storing a table of distance measurements is disclosed in the copending and co-assigned application Ser. No. 08/250, 699 of Thomas Lynch, Vladimir Sejnoha and Thomas Dinger, filed May 27, 1994 and entitled Speech Recognition System Utilizing Precalculated Similarity Measurements. The disclosure of that application is incorporated herein by reference.

As is understood by those skilled in the art, natural variations in speaking rate require that some method be employed for time aligning a sequence of frames representing an unknown speech segment with each sequence of states representing a vocabulary word. This process is commonly referred to as time warping.

In isolated word recognition, the sequence of frames which constitute the unknown speech segment taken together with a sequence of states representing a vocabulary model in effect define a matrix and the time warping process involves finding a path across the matrix which produces the best score, e.g., least distance or cost. The distance or cost is typically arrived at by accumulating the cost or distance values associated with each pairing of frame index with state index as described previously with respect to the VQ (vector quantization) process. An isolated word speech recognition system will typically identify the best scoring model and will also identify a ranked list of possible alternates.

Figure 2:
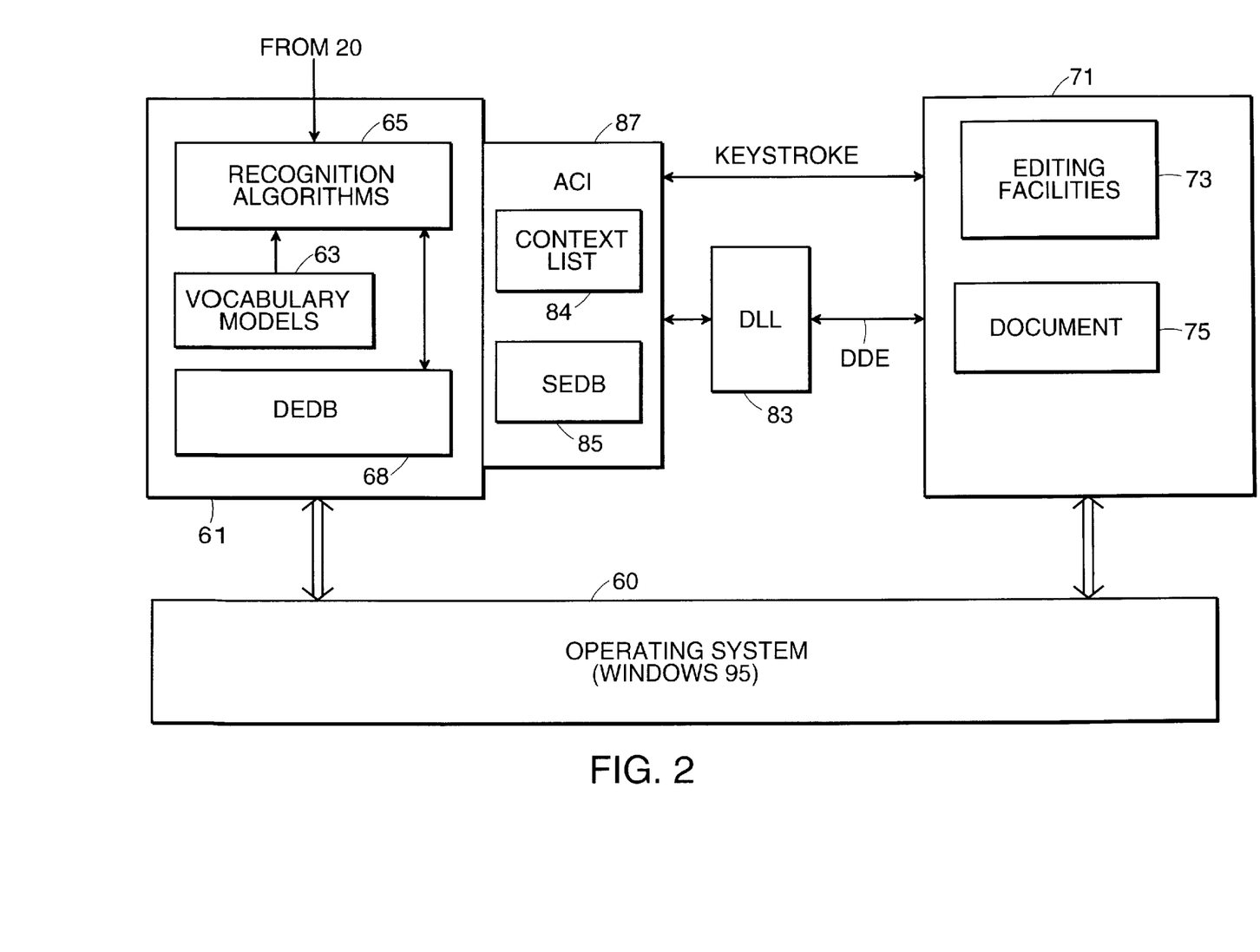
FIG. 2 is a block diagram representing the software components of a speech recognition and editing system in accordance with the present invention.

The speech recognition system 61 preferably also implements voice editing and correction commands, i.e. the translation of the utterance will initiate a control activity rather than outputting a text item to the editing application program 71. Various such commands and their implementation are described in the previously identified Goldhor et al. U.S. Pat. No. 5,231,670. For example, the system may implement a Take(N) command where N designates the position of a desired entry in the list of alternate translations. The response to this command is to then substitute the selected alternate translation for the initially highest scoring translation. As described in the previously identified U.S. Pat. No. 5,127,055, such corrections can also be utilized to improve the vocabulary models so that the speech recognition system gradually learns or accommodates to the voice of a given user. This improvement or "learning" utilizes the acoustic information from the original utterance which is stored in the dictation event database along with the list of alternates. Other commands the system may also implement include a "SCRATCH THAT" command which allows the user to delete a text entry. Similarly, commands may be implemented for navigation within a document, e.g. Back (N) or Forward(N), which allows the user to move backwards or forward N number of words within the document.

As is understood by those skilled in the art, modern operating systems are typically multi-tasking in that they will allow multiple application programs to run at the same time. Likewise, the operating systems facilitate the ability of one program to add functionality to another program and for inter-process communication. The preferred embodiment described herein is particularly adapted for operation in the context of the Windows 95 operating system sold by the Microsoft Corp. of Bellevue, Wash. This operating system is designated generally by reference character 60 in FIG. 2. In the Windows 95 system, functionality can be added to an existing application program by means of a mechanism known as a dynamically linked library (DLL) and inter-process communications are implemented through a facility known as an application control interface (ACI) or alternatively DDE (Dynamic Data Exchange). The speech recognition system described herein is the Kurzweil VOICE system sold by Kurzweil Applied Intelligence, Inc. of Waltham, Mass. The present invention relates particularly to a method of facilitating cooperation between that speech recognition system and text editing and word processing application programs such as Word, available also from Microsoft, and WordPerfect which is sold by Corel Corporation.

An advantage of the approach employed by the present invention is that the speech recognition system can be adapted for use in conjunction with different editing programs by merely writing program components, e.g. a DLL and an ACI, for each such editing or word processing program without modifying the basic speech recognition system or directly changing the editing program.

As illustrated generally in FIG. 2, the word processing system designated generally by reference character 61 incorporates a collection of word models 63 which constitute the recognition vocabulary together with a collection of recognition algorithms 65 for selecting those models which best match with an input utterance. In addition, the speech recognition system maintains a dictation event database (DEDB) 68 which constitutes a historical record of recognition events. In particular, the DEDB includes the list of alternate translations which were identified at the same time as the best match translation. The DEDB preferably also includes acoustic information from the original utterance which can be used for improving word models. The DEDB may also include other data elements as described in greater detail in the aforementioned U.S. Pat. No. 5,231,670.

A word processing or editing application program is designated generally by reference character 71. While the characteristics of such programs will differ from manufacturer to manufacturer, each will typically include editing facilities, designated generally by reference character 73, for manipulating text items in a document 75. In the context of the present invention a text item may be any word, punctuation or white space in the document. An "insertion point" is a position (typically marked by a cursor) between two text items.

In accordance with one aspect of the present invention, adjunct program components, e.g. an ACI and a DLL in the case of Windows 95, is provided in conjunction with the editing program 71 and the speech recognition system 61. In FIG. 2, the ACI is designated generally by reference character 87 and the DLL is designated generally by reference character 83. A principal function of the ACI 87 is to maintain a context list 84 and a speech event database (SEDB) designated generally by reference character 85. Though the SEDB to some extent parallels the DEDB, there are differences as is explained hereinafter and the SEDB is more directly associated with the editing program than the speech recognition system itself though it typically resides in the address space of the speech recognition program 61 and the associated ACI 87. Communications between the editing program and the ACI 87 are facilitated by the DLL 83. The system components can also communicate, e.g. for commands by transmitting keystroke information in conventional manner.

Figure 3:
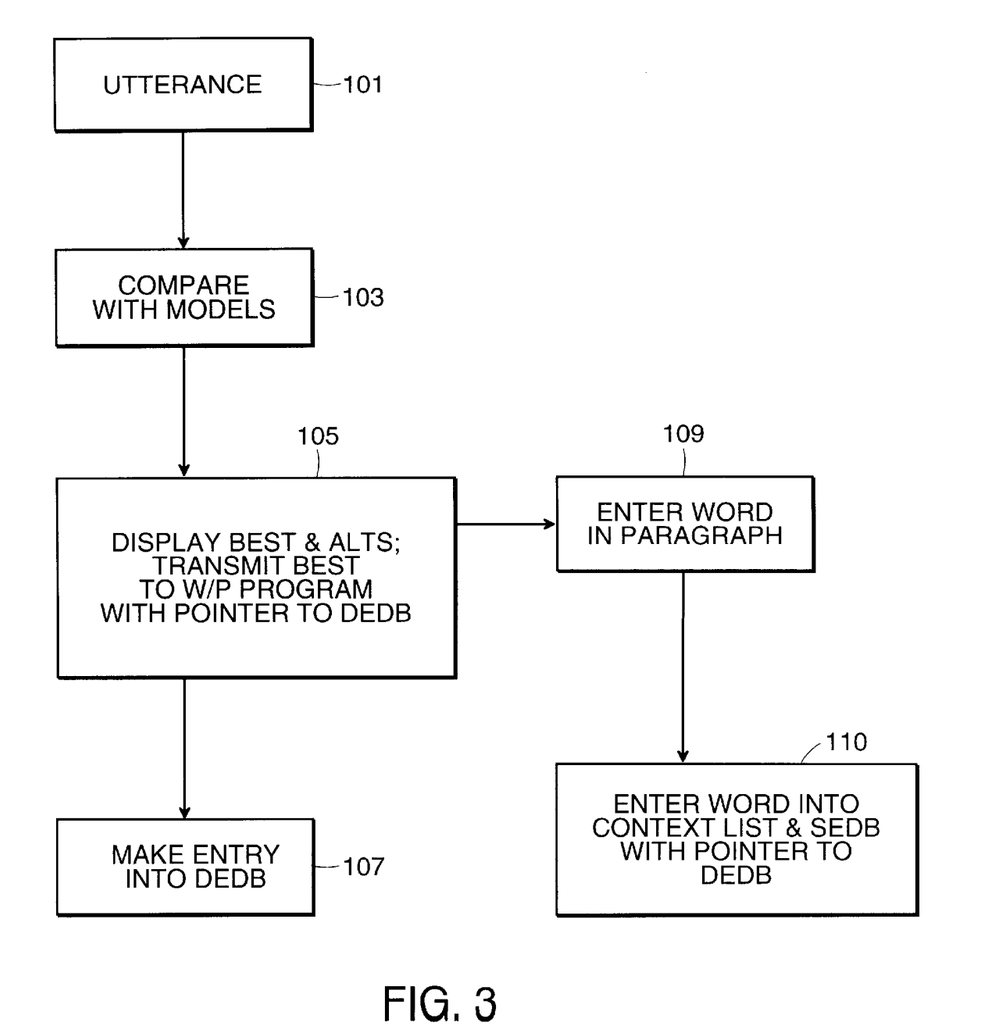
FIG. 3 is a flowchart representing a process of entering text items into a document being edited by speech recognition.

FIG. 3 illustrates the basic steps which occur during dictation of text for entering into the document 75 being generated by the editing or word processing program 71. A spoken utterance 101 is compared with the vocabulary of models as indicated at 103. The speech recognition system displays the best match translation, e.g. word, and also a list of alternates. The best match is also (immediately) transmitted to the word processing program. Each text word recognized also causes an entry to be made into the DEDB as indicated at 107. Along with the best match text word, the speech recognition program transmits to the editing program a pointer to the corresponding entry in the DEDB.

On the editing program side, the text word is entered into the document as indicated at 109 and a corresponding entry is made into the context list 84 and into the speech event database SEDB 85. The entry into the SEDB includes a pointer to the corresponding entry in the dictation event database (DEDB). As long as the user only moves around in the document using spoken commands which are processed by the word processor, synchronization can be easily maintained between the SEDB and DEDB. Accordingly, if the user returns in this fashion to a word which was previously spoken and perhaps misrecognized, he can correct it with voice commands just as when it was originally recognized since the pointer in the SEDB entry will allow access to the list of alternate translations (ALTS) stored in the DEDB. If, however, the user moves the edit cursor with the mouse 27 or by keyboard entry, this synchronization is lost.

Figure 4:
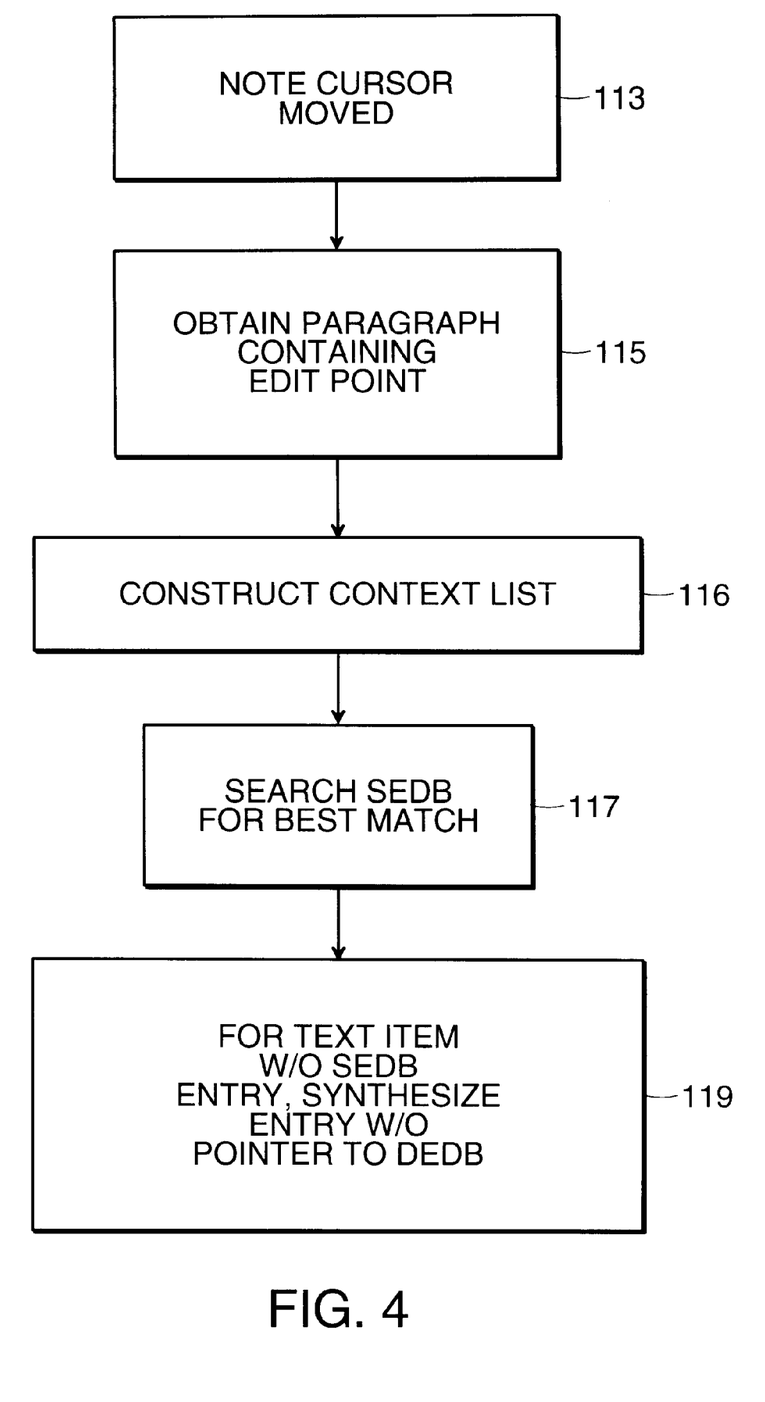
FIG. 4 is a flowchart illustrating steps which occur when a user changes the edit points in a document being edited.

The DLL incorporates a provision for noting when the user moves the cursor. Rather than continuously tracking the cursor, which would place a heavy demand on system resources, the DLL merely incorporates a timer which periodically checks the position of the cursor and compares it with the last known position, e.g., every 750 milliseconds. With reference to FIG. 4, if it is noted, as indicated at block 113, that the cursor has been moved (other than through speech commands), a series of actions are initiated. Firstly, as indicated at block 115, the paragraph containing the edit point is obtained from the edit program. In some word processing programs, the paragraphs are marked and retrieval is straightforward and in other situations, the DLL will have to be written so as to examine the document character string so as to empirically determine the start and end points of a paragraph.

The paragraph obtained is used to construct a new context list (block 116) in which each entry not only identifies the text word but also indicates left and right context.

A particular insertion point in a document may correspond to exactly one insertion context. When a selection is not active, the current text item may be determined using the rules represented in the table below. The left hand column corresponds to the item immediately left of the insertion point, the top row corresponds to the item to the immediate right of the insertion point. To find the current context item, locate the entry corresponding to the text items around the insertion point in the table. Each entry in the table consists of the item abbreviation for the item that will be considered current. If there is an '-L' or '-R' attached it means the next instance of that type of item the left or right respectively of the current insertion point, while '-?' means it could be the first of that type of item in either direction.

CONTEXT BEHAVIOR TABLE

| LEFT/RIGHT ITEM | WD | SP | PU |
|---|---|---|---|
| WD | WD-L | WD-L | WD-L |
| SP | SP-L/WD-R | SP-L/WD-?/PU-2 | PU-R |
| PU | PU-L | PU-L | PU-L |

Figure 5:
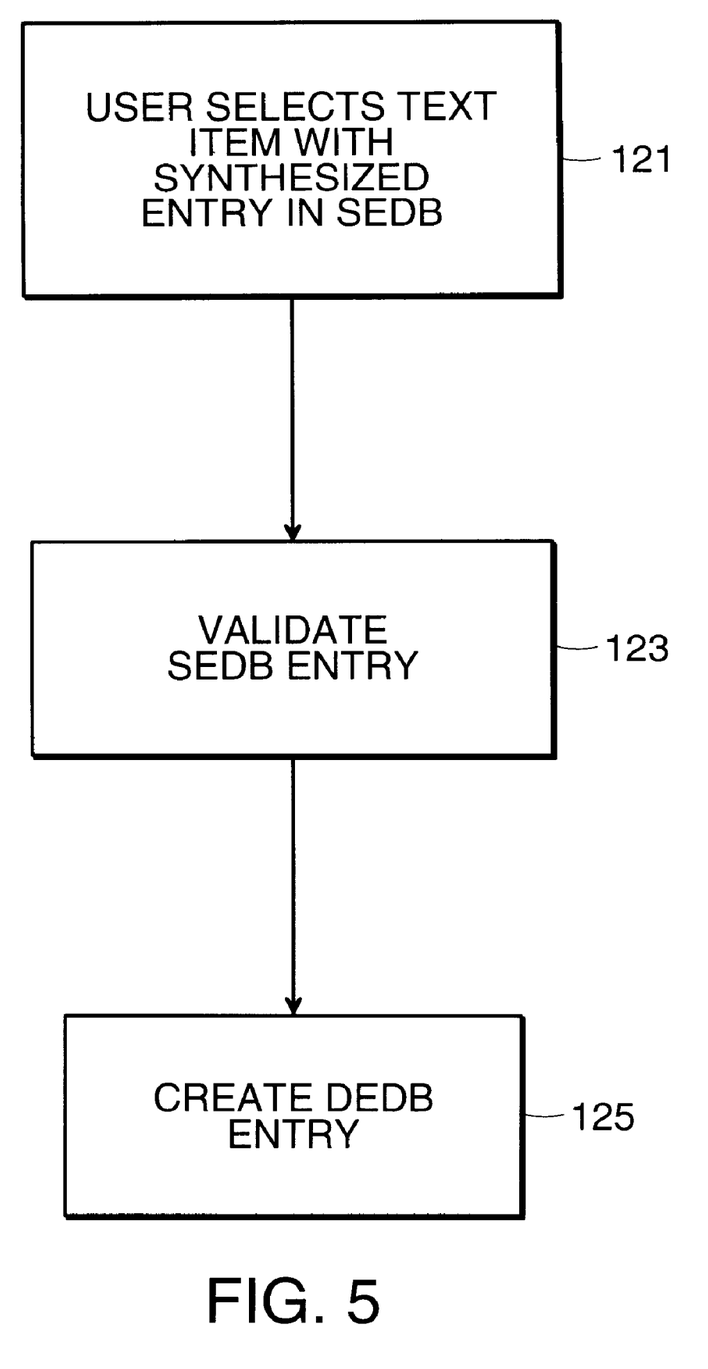
FIG. 5 is a flowchart illustrating steps which occur when a user selects a text item in a document corresponding to a synthesized entry in a speech event database.

Item Abbreviation Description:
WD Word (alphanumeric string)
SP Whitespace
PU Punctuation As indicated at block 117, the speech event database (SEDB) is then searched to determine if it contains a paragraph which matches with the context list. The searching is preferably facilitated by generating a hash table of the entries in the SEDB. If the context list generally matches with a paragraph in the SEDB but there are, in the context list, text items which do not have matches in the paragraph as found in the SEDB, entries to the SEDB are synthesized, or as sometimes described herein "hallucinated". In this way, every word or text item in the paragraph will have a corresponding entry in the SEDB. Synthesized entries, however, will not include a pointer to a corresponding entry in the DEDB unless the user actually places the cursor on that item. This latter process is illustrated in FIG. 5. If the user selects a text item whose corresponding entry in the SEDB is synthesized, the SEDB entry will be, in one sense, validated so that it will continue to exist even if the user moves to a different paragraph. This is indicated at block 123. At the same time, a tentative entry is created in the DEDB as indicated at block 125. This facilitates the storing of characterizing information if the user then corrects or changes the text item using voice commands.

Figure 6:
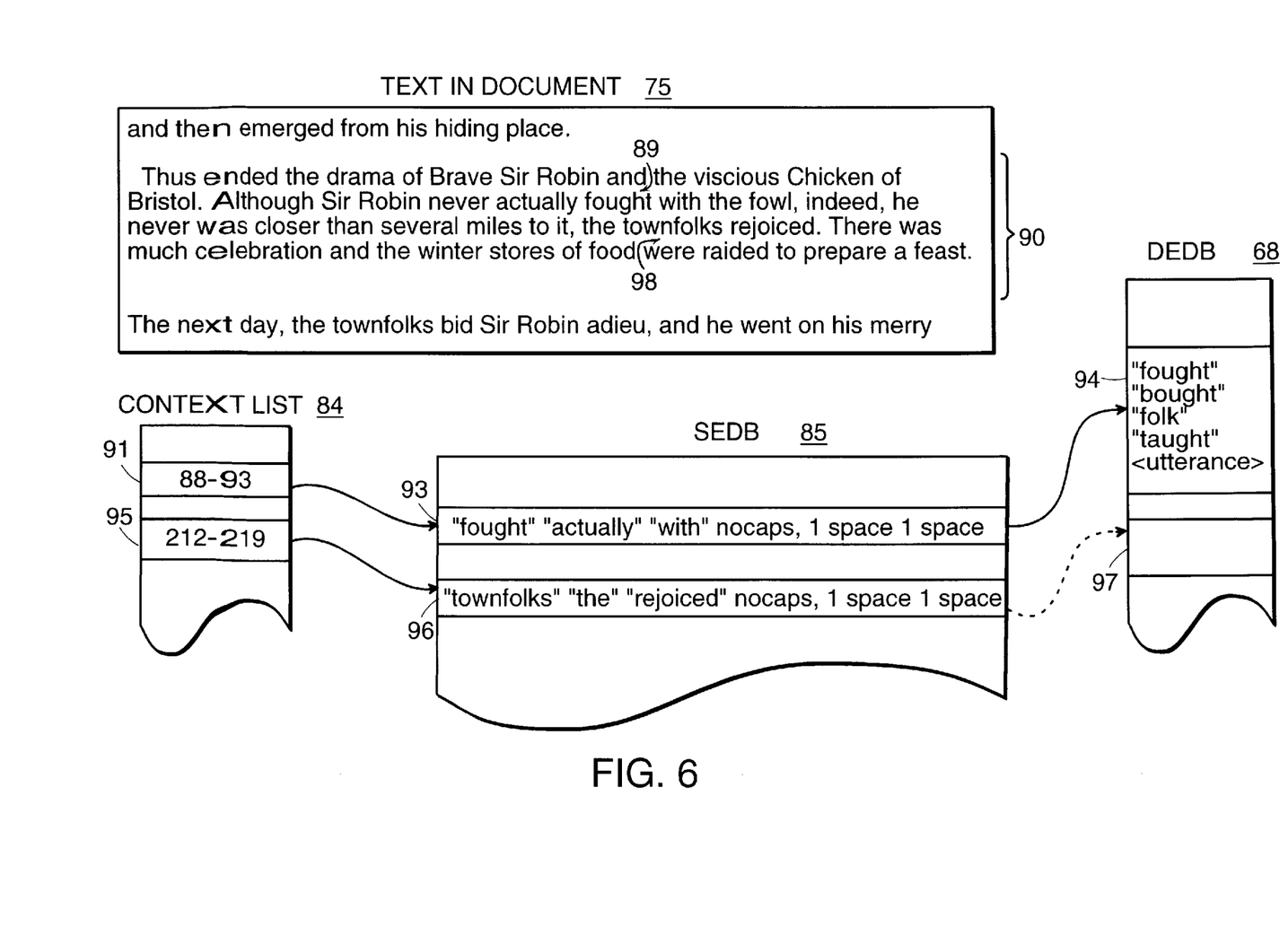
FIG. 6 is a diagram illustrating relationships between various data components of the system.

An example of the functioning of a preferred embodiment of the present invention is shown in FIG. 6. A user moves the insertion point in document 75 to some point within paragraph 90. The present invention will then scan paragraph 90 to create a new context list 84. Starting at the beginning of paragraph 90 each word is examined and the SEDB 85 is scanned to determine whether it contains and entry for that word. As previously described, several factors are checked including the word itself, left and right words, capitalization, and left and right surrounding spaces.

For example, the word "fought" as shown by arrow 89 was inserted by a speech event from the user. The SEDB 85 contains an entry 93, which matches the word "fought", with the words "actually" on the left and "with" on the right, contains no capitalization, and has one space on either side. Therefore, the context list 84 will have an index into the document 75 which contains a pointer to the entry 93 in SEDB 85.

The index in context list 84 is based on any criteria, for this example the index 88–93 indicates the beginning and end position of the word "fought" based on index from the beginning of the paragraph 90.

Since the word "fought" 89 contains an entry 93 in SEDB 85, there will be a pointer from entry 93 to the dictation event 94 in DEDB 68. The Dictation Event 94 contains information from the speech utterance which produced the word "fought". As previously described, dictation event 94 typically includes alternative words and a record of the actual speech event.

The scanning of paragraph 90 continues, and as a second example, the word "townfolks" as shown by arrow 98 is detected. This word was inserted by the user typing, so there is no corresponding speech event in SEDB 85.

Upon determining that the SEDB 85 contains no entry, the system synthesizes an entry 96. This entry contains the same information regarding the word as if there was a speech event already in the SEDB 85. However, there is no corresponding dictation event in DEDB 68.

Once the entire paragraph 90 is scanned, there is an entry for every word in SEDB 85, and the context list 84 includes an index to that word in the paragraph and the corresponding entry into SEDB 85.

When a user positions the insertion point on a word, the information on that word is then readily determinable to provide immediate access to historical information. For example, suppose the user positions the insertion point next to or within the word "fought" 89. The system is informed that the cursor positioned has changed. By querying the application 21, the cursor position inside paragraph 90 is determined. If the cursor position is at index ninety from the beginning of paragraph 90. The context list 84 that this index location reefers to speech event 93 in SEDB 85, which also has a pointer to the dictation event 94 in DEDB 68.

The system now has information to present the user with options regarding the present word, including the ability to choose a different word from the dictation event, or other operations. All the information calculated and available to the user when the word "fought" was dictated is again available.

Now suppose the user positions the insertion point on the word "townfolks" 89. Since this word was not dictated, there is no corresponding dictation event in DEDB 68. There is a speech event 96, which was synthesized when the paragraph was scanned. When a word is selected which doesn't have a corresponding dictation event, the word is the "realized". A pointer into location 97 in DEDB 68 is hallucinated (synthesized), and now exists for the speech event. Therefore, if the user chooses to correct the word "townfolks" via "correct-that", a dictation event 97 will then exist for that word 98 in the document 75. Accordingly, any time the user returns the insertion point to the word 98, the speech event 96 and dictation event 97 will be readily available to provide information.

When a dictation event in DEDB 68 is updated (or created for the first time), the corresponding speech event in SEDB 85 is updated, including the word and all information for left and right context, etc. The entry in context list 84 is then also updated.

When a user moves the insertion point to another paragraph, the new paragraph is then scanned. All information is in the context list 84 is deleted, and new entries are created for all words in the new paragraph. For the SEDB 85, any speech events which are realized and have been corrected will have a corresponding dictation event in DEDB 68. Unrealized synthesized speech events in SEDB 85 are discarded. Speech events not in the context list are discarded using an oldest first (FIFO) queue.

As indicated earlier, maintaining context or synchronization between the editor and speech recognition systems DEDB greatly facilitates editing since if the user returns to a word which was entered by dictation earlier and notices that it was misrecognized, the list of alternate translations will be available. Since the list of alternate translations is quite likely to contain the correct word, the user can easily designate it, e.g. with the Take(N) command described earlier. Further, when the user corrects a misrecognized word in this fashion, that correction event can be utilized in the updating and improving of the collection of vocabulary models just as is done when a user immediately corrects a misrecognized utterance during dictation. As will be understood, it may not always be convenient to correct every misrecognition just as it occurs. Rather, it will often be more natural to dictate a whole block of text and then return any words which are misrecognized. The present invention allows this returning to occur by straightforward mouse or keyboard operations as well as by voice commands.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A method for facilitating access to supplemental information relating to text items entered into an editing application program by a speech recognition system, said supplemental information being stored in a dictation event database (DEDB) maintained by the speech recognition system, said method comprising:

maintaining a speech event database (SEDB) containing text items entered by said speech recognition system;

in response to a user initiated change in the editing point in the editing program, extracting and caching a preselected region of text around the new editing point and creating as a context list characterizing said region;

searching the speech SEDB event database for text items matching items in said context list thereby to create a mapping of the list to the SEDB;

using said speech event database as an index into said dictation event database for accessing said supplemental information.

2. The method of claim 1 wherein said supplemental information includes alternate translations of utterances analyzed by said speech recognition system.

3. The method of claim 1 wherein said speech event database includes context information identifying preceding and following text items.

4. The method of claim 1 further comprising the synthesizing of new items in the speech event database corresponding to context list items for which no match was found.

5. The method of claim 1 wherein said preselected region of text is a text paragraph which includes the new editing point.

6. A method for facilitating access to supplemental information relating to text items entered into an editing application program by a speech recognition system, said supplemental information defining alternate possible translations of utterances stored in a dictation event database (DEDB) maintained by the speech recognition system;

maintaining a speech event database (SEDB) associated with the editing program containing text items entered by said speech recognition system and context information identifying preceding and following text items;

in response to a user initiated change in the editing point in the editing program, extracting and caching a preselected region of that around the new editing point and creating a context list characterizing said region;

searching the speech SEDB event database for text items matching items in said context list thereby to create a mapping of the list to the SEDB;

using said speech event database as an index into said dictation event database for correcting previously misrecognized utterances.

7. The method of claim 6 further comprising the synthesizing of new items in the speech event database corresponding to context list items for which no match was found.

8. The method of claim 6 wherein said preselected region of text is a text paragraph which includes the new editing point.

9. A method for facilitating access to supplemental information relating to text items entered into a word processing application program by a speech recognition system, said supplemental information including alternate translations of dictation events stored in a dictation event database (DEDB)

maintained by the speech recognition system; maintaining a speech event database (SEDB) associated with the editing program containing text items entered by said speech recognition system;

in response to a user initiated change in the editing point in the editing program, extracting and caching a paragraph and creating as a context list characterizing a region of text around the new editing point;

searching the speech SEDB event database for text items matching items in said context list thereby to create a mapping of the list to the SEDB and synthesizing new items in the SEDB corresponding to context list items for which no match is found;

using said speech event database as an index into said dictation event database for correcting previously misrecognized dictation events.

10. The method of claim 9 wherein said speech event database includes context information identifying preceding and following text items.

* * * * *